United States Patent [19]
Gimino

[11] Patent Number: 5,845,911
[45] Date of Patent: Dec. 8, 1998

[54] REPLACEMENT SPLIT BOOT ASSEMBLY

[75] Inventor: Philip J. Gimino, Warrenville, Ill.

[73] Assignee: L&S Automotive Products Co., Oklahoma City, Okla.

[21] Appl. No.: 651,287

[22] Filed: May 22, 1996

[51] Int. Cl.⁶ ........................................................ F16J 9/08
[52] U.S. Cl. ........................... 277/636; 277/631; 277/634; 411/508
[58] Field of Search ....................... 277/212 FB; 403/50, 403/51; 464/170, 173, 175; 411/508, 509, 510, 517, 338, 339

[56] References Cited

U.S. PATENT DOCUMENTS

| | | | |
|---|---|---|---|
| 2,226,388 | 12/1940 | Richter | 403/50 |
| 3,494,244 | 2/1970 | Wayland | 411/510 |
| 3,803,670 | 4/1974 | Johnson | 411/508 |
| 4,902,182 | 2/1990 | Lewis | 411/510 |
| 4,976,715 | 12/1990 | Bays et al. | 606/77 |
| 5,039,267 | 8/1991 | Wollar | 411/508 |
| 5,135,342 | 8/1992 | Scott | 411/338 |
| 5,182,956 | 2/1993 | Woodall et al. | 277/212 FB |
| 5,232,322 | 8/1993 | Regensburger | 411/33 |
| 5,387,065 | 2/1995 | Sullivan | 411/510 |
| 5,390,397 | 2/1995 | Kremer et al. | 411/517 |
| 5,423,858 | 6/1995 | Bolanos et al. | 411/517 |
| 5,431,601 | 7/1995 | Nakamura | 464/175 |

FOREIGN PATENT DOCUMENTS

| | | | |
|---|---|---|---|
| 2230570 | 10/1990 | United Kingdom | 277/212 FB |
| 2249804 | 5/1992 | United Kingdom | 411/339 |

OTHER PUBLICATIONS

E–Z Boot Packaging and Installation Instructions for Outboard Constant Velocity Split Boot Replacement Kits, published 1993 by Alloy Industries, Inc. (Michigan City, Indiana).

Commercial brochure for Speedi–Boot, Jan. 1988, by Motormite Mfg. Div. of R & B, Inc. (Colmar, Pennsylvania).

*Primary Examiner*—Daniel G. DePumpo
*Attorney, Agent, or Firm*—Mary M. Lee

[57] ABSTRACT

A replacement split boot assembly for a constant velocity joint on a vehicle is provided with slip-fit, non-threaded fasteners. The split boot body has pairs of opposing tabs across a longitudinal slit. Each of the tabs has a hole. The slip-fit, non-threaded fasteners have a head on one end and a radial projection spaced a distance from the head on the shaft. The fasteners are adapted to be urged through the opposing tab holes on the split boot body until the pair of tabs is located between the head of the fastener and the radial projection on the shaft. A retainer is used to lock the tabs between the head of the fastener and the retainer by urging the retainer over the radial projection of the fastener.

22 Claims, 3 Drawing Sheets

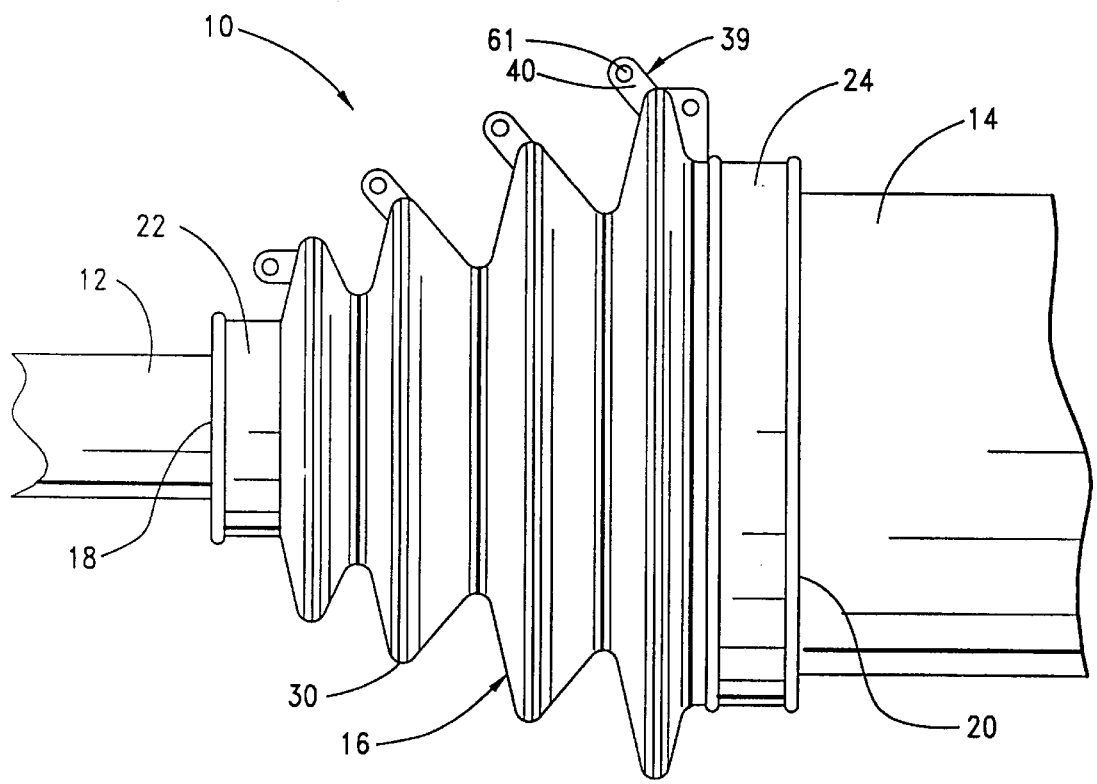
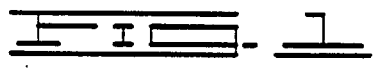
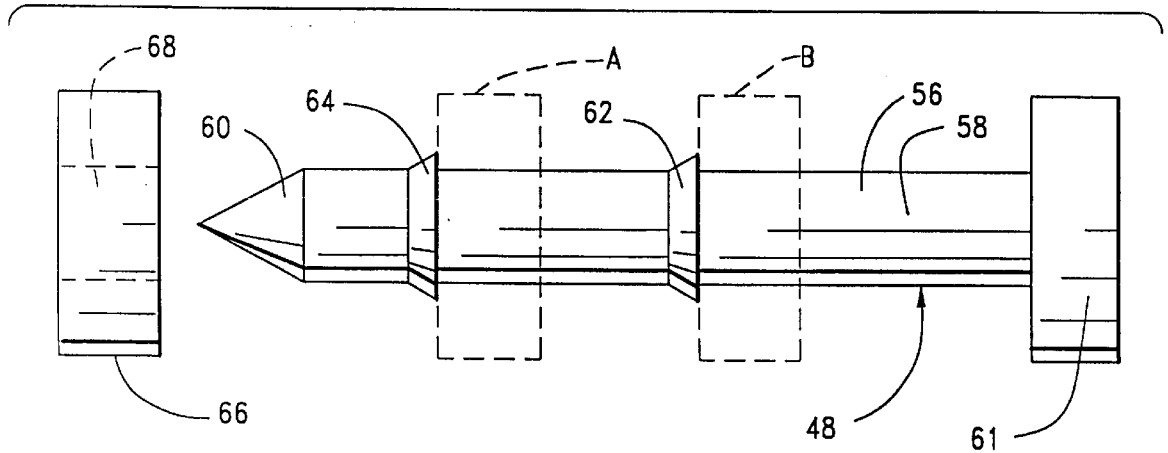
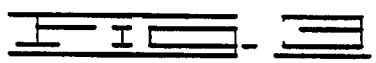

REPLACEMENT SPLIT BOOT ASSEMBLY

FIELD OF THE INVENTION

The present invention relates generally to replacement split boot assemblies for constant velocity joints on axles on vehicles.

SUMMARY OF THE INVENTION

The present invention comprises a replacement split boot assembly for a constant velocity joint on an axle on a vehicle. The assembly includes a split boot comprising a hollow, flexible body adapted to enclose the constant velocity joint. The body of the boot has a longitudinal slit defined by abutting first and second edges. There is a pair of deformable tabs including first and second opposing tabs on the first and second edges of the body, respectively. Each of the first and second tabs has a hole therethrough so that when the first and second edges are abutted the holes in the pair of tabs are aligned.

The assembly further comprises a fastener adapted to connect the pair of tabs. The fastener comprises a non-threaded shaft having a first and second end. The first end is adapted for insertion into the holes in the pair of tabs. The shaft is sized to be received in the holes in the pair of tabs. There is a non-deformable head on the second end of the shaft adapted to prevent passage of the head through the holes in the pair of tabs. Further, the fastener comprises a deformable radial projection on the shaft spaced a distance from the head. The distance between the head and the radial projection is sufficient to receive the pair of tabs. The radial projection is sized to resist passage through the holes in the pair of tabs. The fastener can be inserted through the holes in the pair of tabs by urging the radial projection through the holes in the pair of tabs until the pair of tabs is positioned between the head and the radial projection on the shaft.

Still further, the present invention comprises a replacement split boot assembly kit for a constant velocity joint on an axle on a vehicle. The kit includes a split boot comprising a hollow, flexible body adapted to enclose the constant velocity joint. The body of the boot has a longitudinal slit defined by abutting first and second edges. There is a pair of deformable tabs including first and second opposing tabs on the first and second edges of the body, respectively. Each of the first and second tabs has a hole therethrough so that when the first and second edges are abutted the holes in the pair of tabs are aligned. The split boot further comprises a first and second end. The first end of the body is sized to engage the axle proximal to the constant velocity joint and the second end of the body is sized to engage the axle distal to the constant velocity joint.

The kit further comprises a fastener adapted to connect the pair of tabs. The fastener comprises a non-threaded shaft having a first and second end. The first end is adapted for insertion into the holes in the pair of tabs. The shaft is sized to be received in the holes in the pair of tabs. There is a non-deformable head on the second end of the shaft adapted to prevent passage of the head through the holes in the pair of tabs. Further, the fastener comprises a deformable radial projection on the shaft spaced a distance from the head. The distance between the head and the radial projection is sufficient to receive the pair of tabs. The radial projection is sized to resist passage through the holes in the pair of tabs. The fastener can be inserted by urging the radial projection through the holes in the pair of tabs until the pair of tabs is positioned between the head and the radial projection on the shaft.

The kit further comprises a first and second seal member. The first seal member is adapted to secure the first end of the split boot around the axle proximal to the constant velocity joint, and the second seal member is adapted to secure the second end of the split boot around the axle distal to the constant velocity joint. Additionally, the kit includes a container of lubricant for greasing the split boot assembly and the constant velocity joint. The kit further includes a package sized to hold the split boot body, fastener, first and second seal members, and the container of lubricant.

BRIEF DESCRIPTION OF THE DRAWINGS

FIG. 1 is a side elevational view of a split boot assembly constructed in accordance with the present invention. The assembly is shown enclosing the constant velocity joint on the axle for a vehicle.

FIG. 6 is front elevational view of the retainer.

FIG. 7 is an exploded side elevational view of a split boot assembly kit in accordance with the present invention.

DETAILED DESCRIPTION OF THE PREFERRED EMBODIMENT

Figure 2:
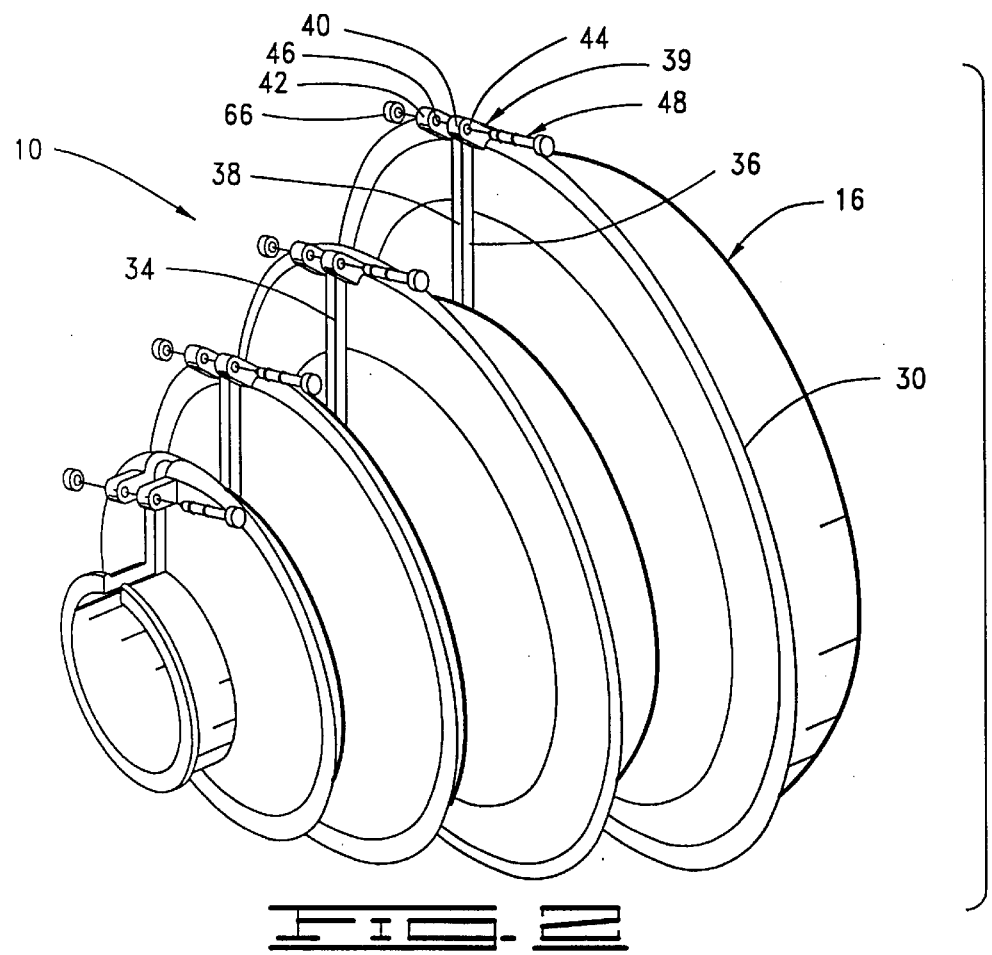
FIG. 2 is an exploded, perspective view of the split boot assembly shown in FIG. 1. For clarity, the axle and constant velocity joint are not shown.

Many automobiles today, most rear-wheel drive and four-wheel drive as well as all front-wheel drive automobiles, are equipped with constant velocity joints. Drivetrains for front-wheel drive automobiles usually are made up of two half-shafts. Each halfshaft comprises a series of axles connected together by the use of constant velocity joints. Each halfshaft typically contains two constant velocity joints. On each of the halfshafts, the constant velocity joint nearest to the centerline of the automobile is commonly called the "inboard" joint, while the constant velocity joint closest to the wheel assembly is commonly referred to as the "outboard" joint. The constant velocity joints allow the rotating motion of one axle to be transferred to another axle which eventually leads to the rotating motion of the wheels. Additionally, the constant velocity joint allows the axles to accommodate the up and down motion of the suspension. These joints are kept lubricated, and to protect the joint from dirt and debris they are covered with a flexible cover or "boot."

During the assembly of the vehicle, the assembly plant slides an integrally formed flexible boot over the constant velocity joints. Eventually these factory installed, flexible boots wear out and must be replaced. Since the original boot is integrally formed, removal of the boot involves either cutting the boot off or disassembling the wheel and halfshaft assemblies to get at the boot to slide it off. Due to the difficulty in disassembling the wheel and halfshaft assemblies, the boot is usually removed by cutting it off and replacing the original boot with a split boot. Because the replacement split boot has a longitudinal slit, the boot may be wrapped around the joint and closed without disassembling the wheel and halfshaft assemblies.

Closing a split boot requires fastening devices such as either a nut and bolt combination or a glue sealant. A split boot designed for use with nut and bolt fasteners will typically contain several pairs of opposing tabs with aligned holes for receiving a screw type fastener. The person installing the split boot must slip the bolt through the opposing tab holes followed by threading the nut onto the bolt. The process of threading the nut on the bolt is quite difficult because the nut and bolt is very small and because the split boot has to be installed in limited spaces underneath a vehicle. Compounding this tedious task is the fact that typical split boots contain several pairs of tabs each of which have to have a nut and bolt fastener placed through them.

The use of a glue sealant to close the split boot also has disadvantages. While underneath the vehicle, the sealant is placed along the split of the boot, and the boot is closed allowing the glue to seal the two edges of the boot. The glue sealant is typically in liquid form and often chemically toxic. Because the sealant is in liquid form, installing the sealant can often lead to messy and potentially hazardous working conditions. While the person is under the vehicle installing the split boot, the sealant can drip down into the face or on to the hands, clothes, and tools of the person doing the installation.

The present invention eliminates these common and difficult problems involved in closing a split boot. In accordance with this invention, a split boot is provided with slip-fit, non-threaded fasteners through the pairs of opposing tab holes of the split boot. The fasteners are secured in the tab holes by sliding a retainer over the end of the fastener. The retainer locks the pair of tabs together on the shaft of the fastener and prevents the fastener from sliding out of the tab holes.

The non-threaded fastener of the present invention is superior to the conventional fastening devices. Because the shaft of the fastener is non-threaded, the tedious exercise of having to thread tiny nuts onto tiny bolts in very limited spaces is simplified. Further, the mess, clean up and toxicity associated with glue sealants is avoided.

With reference now to the drawings in general and to FIG. 1 in particular, there is shown therein a split boot assembly constructed in accordance with the present invention and designated generally by reference numeral 10. The split boot assembly 10 houses a constant velocity joint (not shown in FIG. 1) where the joint couples the proximal axle 12, sometimes called a driveshaft, and the distal axle 14, sometimes referred to as the outer race or outer housing. For an outboard constant velocity joint, the proximal axle 12 or driveshaft is that axle closest to the centerline or transaxle of the vehicle while the distal axle 14 or outer race is that axle closest to the wheel assembly of the vehicle. Now it will appreciated that the embodiment shown and described herein is for an "outboard" constant velocity joint on a front wheel drive vehicle, but the invention is equally applicable to inboard joints.

The split boot assembly 10 comprises a body 16 sized to enclose the joint. The body 16 is formed of some suitable flexible, deformable, water-proof material such as rubber. The body 16 is generally conical in shape having first and second open ends 18 and 20. The first end 18 is sized to engage the proximal axle 12. The second end 20 of the body 16 is sized to engage the distal axle 14.

The assembly 10 further comprises a first seal member 22 adapted to secure the first end 18 of the split boot 16 around proximal axle 12. Likewise, the assembly 10 includes a second seal member 24 adapted to secure the second end 20 of the split boot 16 around the distal axle 14. The first and second seal members 22 and 24 can be metal bands or any other suitable device for sealing the first and second ends 18 and 20 of the split boot 16 around the distal and proximal axles 12 and 14, respectively. Moreover, depending on the type of the vehicle, either of the first or second seal members 22 and 24, or both, may not be needed.

The split boot body 16 is adapted to be longitudinally flexible. To that end, the body 16 is formed into a plurality of circumferential pleats, a representative one of which is designated by the reference numeral 30.

Turning now to FIG. 2, the split boot assembly 10 is represented in an exploded, perspective view. The split boot body 16 has a longitudinal slit 34 defined by abutting first and second edges 36 and 38. On the first and second edges 36 and 38 of the body 16, there is at least one pair and preferably a plurality of pairs of opposing tabs, one such pair being designate by the reference numeral 39 and comprising the tabs 40 and 42. As the pairs 39 of tabs are similarly formed, only the pair comprising tabs 40 and 42 will be described in detail herein. Although the pair 39 of tabs in the preferred embodiment herein, extend at an angle from the periphery of the pleats 30, it will be appreciated that the number, shape and position of the pairs 39 of tabs may vary.

With continuing reference to FIG. 2, the first and second tabs 40 and 42 have first and second holes 44 and 46 therethrough so that when the first 36 and second edges 38 of the body 16 are abutted the first and second holes in the tabs are aligned. Preferably, the tabs 40 and 42 are formed of relatively deformable material. Thus, in most instances it will be expedient to form the body 16 integrally with the pairs 39 of tabs. As used herein, "relatively deformable" as applied to the tabs means deformable to the extent that the fasteners, yet to be described, can be urged through the holes 44 and 46 with minimum effort.

To connect the tabs 40 and 42, the split boot assembly 10 further comprises at least one and preferably a plurality of fasteners 48. As seen in FIG. 2, and better illustrated in the enlarged elevational view of FIG. 3, the fastener 48 comprises a non-threaded shaft 56 having a first 58 and second end 60 with a relatively non-deformable head 61 on the first end. As used herein, "relatively non-deformable" as applied to the head 61 means rigid enough to prevent the passage of the head through the holes 44 and 46 of the deformable tabs 40 and 42 described previously. Of course, the shaft 56 should be sized to be received through the holes 44 and 46, and the head 61 should be sized larger than the holes.

Figures 3, 4:
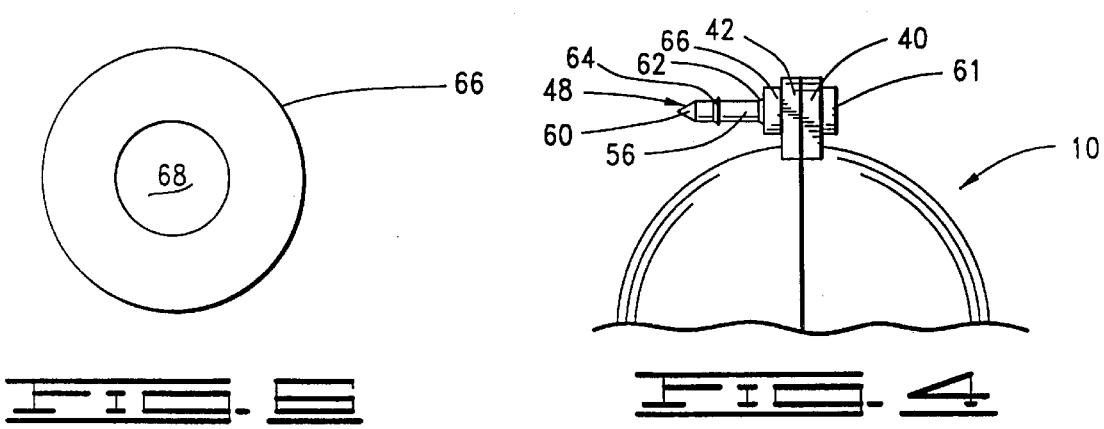
FIG. 3 is an exploded, side elevational view of a fastener and retainer showing, in phantom, two possible positions for the retainer on the fastener.
FIG. 4 is a fragmented, cross-sectional view of the split boot assembly showing thin tabs connected by the fastener with the retainer in a first position.

The second end 60 of the shaft 56, as shown in FIG. 3, preferably terminates in point to facilitate the insertion of the shaft through the holes 44 and 46 in the tabs 40 and 42. However, the second end 60 of the shaft 56 may take on a variety of conformations such as being flat or angled. In addition to aiding in the insertion of the fastener 48 through the tabs 40 and 42, the pointed second end also aids in the placement of the retainer 66, yet to be described.

Referring still to FIG. 3, the fastener 48 further comprises a first radial projection 62 on the shaft 56 spaced a distance from the head 61 sufficient to receive both the tabs 40 and 42. In the preferred embodiment, the first radial projection 62 is a continuous skirt around the shaft 56 and angled towards the head 61 of the fastener 48. Additionally, the preferred embodiment of the present invention has a second radial projection 64 spaced a greater distance from the head 61 on the shaft 56 than the first radial projection 62, for a reason which will become apparent. The second projection 64 also preferably is a continuous skirt around the shaft 56 and angled towards the head 61 of the fastener 48. However, the first and second projections 62 and 64 need not be angled or continuous for the fastener 48 to function. Preferably, the first and second radial projections 62 and 64 are relatively deformable. As used herein, "relatively deformable" means sufficiently flexible to be forced through holes 44 and 46 in the tabs 40 and 42, and through the retainer 66, described hereafter.

Figure 5:
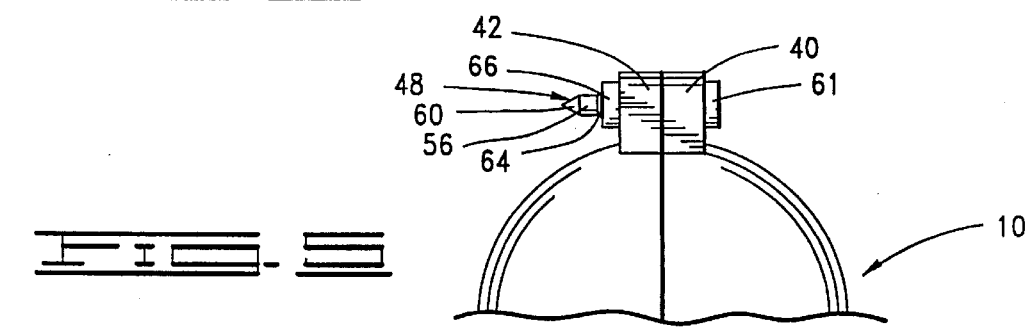
FIG. 5 is a fragmented, cross-sectional view of the split boot assembly showing thick tabs connected by the fastener with the retainer in a second position.
Figure 3:
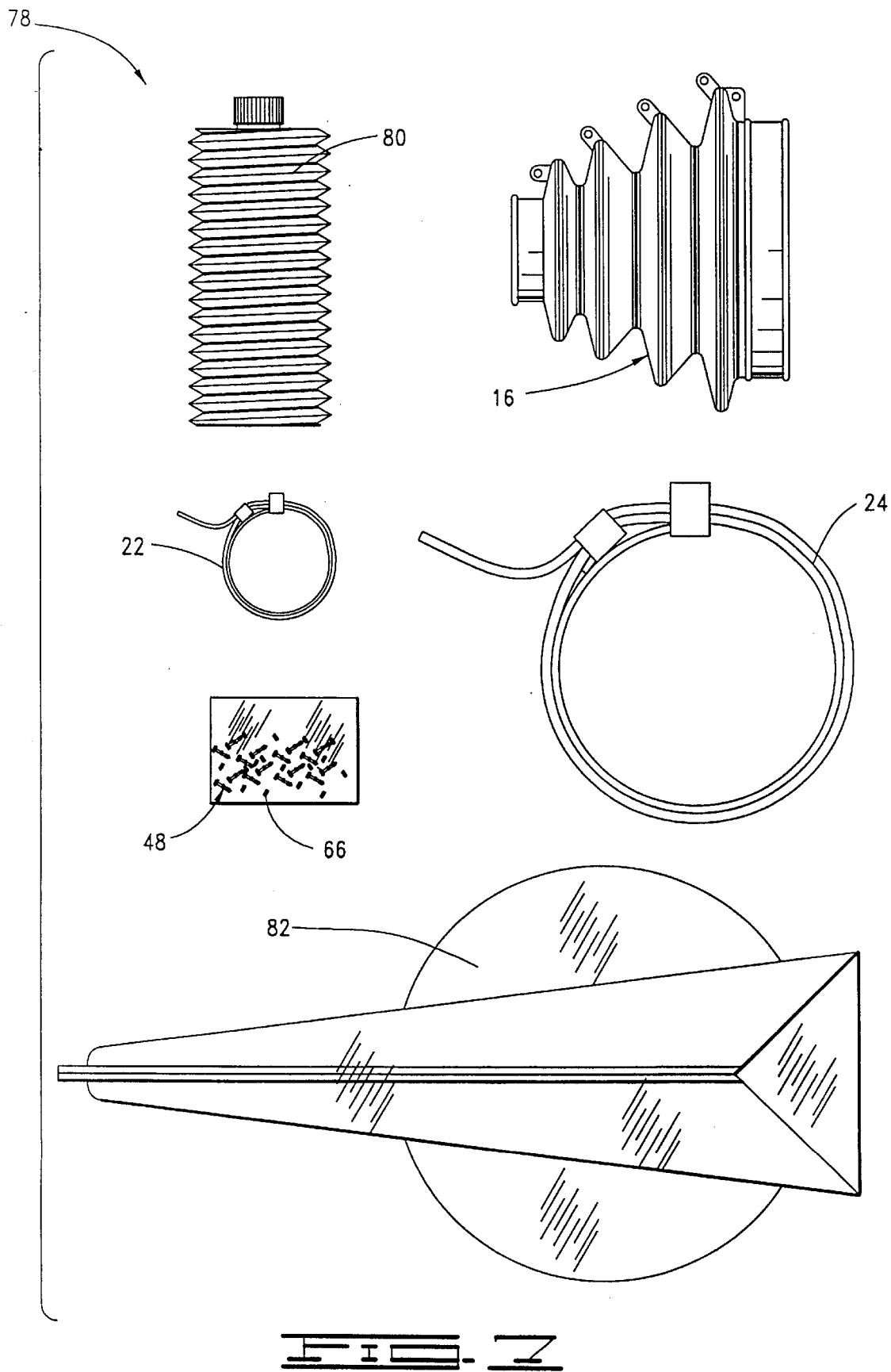

With reference now to FIGS. 4 and 5, it will be appreciated that the fastener 48 is used to connect the tabs 40 and 42 by inserting the pointed end 60 through the holes 44 and 46 and urging the deformable radial projections 62 and 64 until the tabs 40 and 42 are held between the head 61 and either the first radial projection 62 (FIG. 4) or the second radial projection 64 (FIG. 5), depending on the total thickness of the tabs 40 and 42.

With reference still to FIGS. 3–5, but referring now also to FIG. 6, the split boot assembly 10 preferably is provided with a retainer 66 for each of the plurality of fasteners 48. The retainer 66 is adapted to be positioned on the shaft 56 near the first end 58 of the shaft so that in the assembled split boot assembly the pair of tabs 40 and 42 are locked together on the shaft of the fastener 48 between the head 61 and the retainer. Although it can take various forms, the preferred retainer 66 is in the form of a washer, or a flat annular ring with a hole 68 (FIG. 6) therethrough sized to receive the shaft 56 of the fastener 48 and is adapted to be urged over the first radial projection 62 or second radial projection 64 of the fastener. In this way, the fastener 48 is adapted for use with pairs of tabs of different total thicknesses.

Thus, after the fastener 48 is forced through the holes 44 and 46 of the tabs 40 and 42, the retainer 66 can be snapped over the second radial projection 64 into position "A" (FIG. 3). Or, alternatively, if the pair of tabs is thinner, the retainer 66 can be snapped over the second and the first radial projections 62 and 64 into position "B" (FIG. 3). In this way, the retainer 66 serves to lock the pairs of tabs 40 and 42 together snugly and prevent the fastener 48 from reversibly sliding back through the tab holes 44 and 46.

The preferred construction material for the fastener 48 and the retainer 66 is nylon. Any material that allows the first and second projections 62 and 64 and the retainer 66 to flex enough to allow the retainer 66 to pass over the first or second projection with some force and yet return to its original conformation is appropriate. As indicated previously, the head 61 of the fastener 48 and the retainer 66 preferably are relatively non-deformable. Yet, the fastener 48 can be integrally formed of nylon and the desired degree of deformability or non-deformability can be achieved by varying the size and thickness of the respective portions of the fastener and retainer 66. Thus, the head 61 and the retainer 66 will be wider and thicker than the radial projections 62 and 64.

Installation of the replacement split boot assembly 10 of this invention is simple and requires only conventional tools. First, of course, the original boot assembly is removed from the vehicle needing repair. Then, a replacement split boot body 16 of the appropriate size is selected. The body 16 is positioned over the joint and the axles 12 and 14, and the pairs of tabs 39 are aligned. Fasteners 48 of suitable size for the pairs of tabs 39 are pushed through the holes 44 and 46 in the tabs. Now it will be appreciated that the insertion of the fasteners can be accomplished easily by hand, and that the radial projections 64 and 62 will "pop out" to prevent the fasteners 48 from falling out while the installation process is completed.

Having inserted the fasteners 48, a retainer 66 is applied to each fastener 48. For this task, a pair of pliers or, if preferred, a combination seal and joint tool is all that is needed. Using the pliers, the retainer 66 is forced or "snapped" over the radial projection 64 or 62, as appropriate.

Attention again is directed to FIGS. 4 and 5, cross-sectional views of the split boot assembly 10. When the pairs of opposing tabs 40 and 42 on the split boot 16 are thin, the retainer 66 is urged over the first and second radial projections 62 and 64 of the fastener 48 as shown in FIG. 4. It will be appreciated by one skilled in the art that an additional second retainer could be positioned over the first radial projection 62 to ensure that a pair of very thin tabs 40 and 42 on the split boot 16 are firmly locked against one another on the shaft 56 of the fastener 48.

FIG. 5 shows a cross-sectional view of the split boot assembly 10 where the split boot body 16 has a pair of thick tabs 40 and 42. To accommodate this thickness, the retainer 66 is urged over only the second radial projection 64 of the fastener 48. Because the pair of tabs 40 and 42 on the split boot 16 are made of a deformable material, the pair of tabs 40 and 42 will deform around and encompass the first radial projection 62 (not shown in FIG. 6) of the fastener 48. One skilled in the art will appreciate the fact that an additional second retainer could be snapped over the second radial projection 62 to ensure that a pair of thick tabs 40 and 42 on the split boot 16 are firmly locked against one another on the shaft 56 of the fastener 48.

A replacement split boot assembly kit 78 is shown in FIG. 7 in an exploded view. The kit comprises a split boot body 16, first and second seal members 22 and 24 appropriate for the make and model of the vehicle, fasteners 48, retainers 66, a container of lubricant 80 for greasing the inside of the split boot 16 and the constant velocity joint. A package 82 may be provided for holding the components of the kit 78. The preferred package 82 is a clam-shell type, molded package made of transparent material suitable for viewing the inside contents, although many other types of packages and containers would be sufficient. Included in the kit 78, there are at least as many fasteners 48 and retainers 66 as there are pairs 39 of opposing tabs 40 and 42 on the split boot body 16.

The installation of a replacement split boot assembly for a constant velocity joint on a vehicle is greatly simplified by the current invention. The time and hassle of threading a tiny nut on a tiny bolt in a very limited space and the mess and toxicity of a glue sealant is avoided by the use of these slip-fit, non-threaded fasteners.

Changes may be made in the combination and arrangement of the various parts and elements described herein without departing from the spirit and scope of the invention as defined in the following claims.

What is claimed is:

1. A replacement split boot assembly for a constant velocity joint on an axle on a vehicle, the assembly comprising:

a split boot comprising:

a hollow, flexible body adapted to enclose the joint, the body having a longitudinal slit defined by abutting first and second edges; and at least one pair of deformable tabs including first and second opposing tabs on the first and second edges of the body, respectively, wherein each of the first and second tabs has a hole therethrough so that when the first and second edges of the body are abutted the holes in the pair of tabs are aligned;

at least one fastener adapted to connect the pair of tabs, the fastener comprising:
  a non-threaded shaft having a first end and a second end, the second end adapted for insertion into the holes in the pair of tabs and the shaft sized to be received in the holes in the pair of tabs;
  a non-deformable head on the first end of the shaft, the head adapted to prevent passage of the head through the holes in the pair of tabs; and
  a deformable radial projection on-the shaft, the radial projection spaced a distance from the head, the distance being sufficient to receive the pair of tabs, the radial projection being sized to resist passage through the holes in the pair of tabs;
whereby the fastener can be inserted through the holes in the pair of tabs by urging the radial projection through the holes in the pair of tabs until the pair of tabs is positioned between the head and the radial projection on the shaft; and
at least one retainer for the fastener, wherein the retainer is adapted to be positioned on the shaft near the first end of the shaft so that in the assembled split boot assembly the pair of tabs are locked together on the shaft between the head of the fastener and the retainer.

2. The replacement split boot assembly of claim 1 wherein the at least one pair of tabs further comprises a plurality of pairs of tabs and wherein the at least one fastener further comprises a plurality of fasteners.

3. The replacement split boot assembly of claim 2 wherein the radial projection is a continuous skirt.

4. The replacement split boot assembly of claim 3 wherein the projection is angled towards the head of the fasteners.

5. The replacement split boot assembly of claim 4 wherein the at least one retainer further comprises a plurality of retainers for the plurality of fasteners.

6. The replacement split boot assembly of claim 5 wherein the retainers are annular rings adapted to be urged over the radial projection of the fasteners.

7. The replacement split boot assembly of claim 4 wherein the fasteners further comprise a second radial projection spaced a greater distance from the head on the shaft than the first radial projection, so that the fasteners are adapted for use with the pairs of tabs wherein the pairs of tabs are of different total thicknesses.

8. The replacement split boot assembly of claim 7 wherein the second radial projection is a continuous skirt and is angled towards the head of the fasteners.

9. The replacement split boot assembly of claim 8 wherein the at least one retainer further comprises a plurality of retainers for the plurality of fasteners.

10. The replacement split boot assembly of claim 9 wherein the retainers are annular rings sized to be urged over the first and second radial projections of the fasteners.

11. The replacement split boot assembly of claim 1 wherein the body comprises a first end sized to engage the axle proximal to the constant velocity joint and a second end sized to engage the axle distal to the constant velocity joint, and the assembly further comprising:
  a first seal member adapted to secure the first end of the split boot around the axle proximal to the constant velocity joint; and
  a second seal member adapted to secure the second end of the split boot around the axle distal to the constant velocity joint.

12. The replacement split boot assembly of claim 11 wherein:
  the at least one pair of tabs further comprises a plurality of pairs of tabs:
  the at least one fastener farther comprises a plurality of fasteners, wherein the fasteners further comprise a second radial projection spaced a greater distance from the head on the shaft than the first radial projection, so that the fasteners are adapted for use with the pairs of tabs wherein the pairs of tabs are of different total thicknesses, wherein the first and second radial projections are continuous skirts angled towards the head of the fasteners; and
  the at least one retainer further comprises a plurality of retainers for the plurality of fasteners.

13. A replacement split boot assembly kit for a constant velocity joint on an axle on a vehicle, the assembly kit comprising:
  a spit boot comprising:
    a hollow, flexible body adapted to enclose the joint, the body having a longitudinal slit defined by abutting first and second edges;
    at least one pair of deformable tabs including first and second opposing tabs on the first and second edges of the body, respectively, and wherein each of the first and second tabs has a hole therethrough so that when the first and second edges are abutted the holes in the pair of tabs are aligned;
    a first end sized to engage the axle proximal to the constant velocity joint; and
    a second end sized to engage the axle distal to the constant velocity joint;
  at least one fastener adapted to connect the pair tabs, the fastener comprising:
    a non-threaded shaft having a first end and a second end, the second end adapted for insertion into the holes in the pair of tabs and the shaft sized to be received in the holes in the pair of tabs;
    a non-deformable head on the first end of the shaft, the head adapted to prevent passage of the head through the holes in the pair of tabs; and
    a deformable radial projection on the shaft, the projection spaced a distance from the head, the distance being sufficient to receive the pair of tabs, the radial projection being sized to resist passage through the holes in the pair of tabs;
  whereby the fastener can be inserted by urging the radial projection through the holes in the pair of tabs until the pair of tabs is positioned between the head and the radial projection on the shaft;
  at lest one retainer for the fastener, wherein the retainer is adapted to be positioned on the shaft near the first end of the shaft so that in the assembled split boot assembly the pair of tabs are locked together on the shaft between the head of the fastener and the retainer;
  a first seal member adapted to secure the first end of the split boot around the axle proximal to the constant velocity joint;
  a second seal member adapted to secure the second end of the split boot around the axle distal to the constant velocity joint;
  a container of lubricant for greasing the split boot assembly and the constant velocity joint; and
  a package sized to hold the split boot body, fastener, first and second seal members, and container of lubricant.

14. The replacement split boot assembly kit of claim 13 wherein the at least one pair of tabs further comprises a plurality of pairs of tabs and wherein the at least one fastener further comprises a plurality of fasteners.

15. The replacement split boot assembly kit of claim 14 wherein the radial projection is a continuous skirt.

16. The replacement split boot assembly kit of claim 15 wherein the radial projection is angled towards the head of the fasteners.

17. The replacement split boot assembly kit of claim 16 wherein the at least one retainer further comprises a plurality of retainers for the plurality of fasteners.

18. The replacement split boot assembly kit of claim 17 wherein the retainers are annular rings adapted to be urged over the radial projection of the fasteners.

19. The replacement split boot assembly kit of claim 16 wherein the fasteners further comprise a second radial projection spaced a greater distance from the head on the shaft than the first radial projection, so that the fasteners are adapted for use with the pairs of tabs wherein the pairs of tabs are of different total thicknesses.

20. The replacement split boot assembly kit of claim 19 wherein the second radial projection is a continuous skirt and angled towards the head of the fasteners.

21. The replacement split boot assembly kit of claim 20 wherein the at least one retainer further comprises a plurality of retainers for the plurality of fasteners.

22. The replacement split boot assembly kit of claim 21 wherein the retainers are annular rings adapted to be urged over the first and second radial projections of the fasteners.

* * * * *